(12) United States Patent
Schaeuble

(10) Patent No.: US 9,855,921 B2
(45) Date of Patent: Jan. 2, 2018

(54) WIPER DEVICE AND WIPER ARM FOR CLEANING A VEHICLE WINDOW

(71) Applicant: Valeo Systèmes d'Essuyage, Le Mesnil Saint Denis (FR)

(72) Inventor: Michael Schaeuble, Vaihingen/enz (DE)

(73) Assignee: Valeo Systèmes d'Essuyage, Le Mesnil Saint Denis (FR)

(*) Notice: Subject to any disclaimer, the term of this patent is extended or adjusted under 35 U.S.C. 154(b) by 341 days.

(21) Appl. No.: 14/418,958

(22) PCT Filed: Aug. 2, 2013

(86) PCT No.: PCT/EP2013/066336
§ 371 (c)(1),
(2) Date: Feb. 2, 2015

(87) PCT Pub. No.: WO2014/023671
PCT Pub. Date: Feb. 13, 2014

(65) Prior Publication Data
US 2015/0203073 A1     Jul. 23, 2015

(30) Foreign Application Priority Data
Aug. 7, 2012 (DE) .......................... 10 2012 107 232

(51) Int. Cl.
*B60S 1/52* (2006.01)
*B60S 1/34* (2006.01)
*B60S 1/38* (2006.01)

(52) U.S. Cl.
CPC ............. *B60S 1/3415* (2013.01); *B60S 1/345* (2013.01); *B60S 1/3427* (2013.01);
(Continued)

(58) Field of Classification Search
CPC .. B60S 1/48; B60S 1/522; B60S 1/524; B60S 1/3459; B60S 1/345; B60S 1/3415; B60S 1/3436; B60S 1/3443
(Continued)

(56) References Cited

U.S. PATENT DOCUMENTS 2,336,007 A * 12/1943 Fuller .................. B60S 1/3415
15/250.04
2,549,027 A * 4/1951 Smulski ............... B60S 1/3415
15/250.04
(Continued)

FOREIGN PATENT DOCUMENTS

DE  10 2009 051 021 A1   5/2011
DE  10 2010 049 742 A1   5/2012
(Continued)

OTHER PUBLICATIONS

International Search Report for corresponding International Application No. PCT/EP2013/066336, dated Sep. 20, 2013 (3 pages).

*Primary Examiner* — Gary Graham
(74) *Attorney, Agent, or Firm* — Osha Liang LLP

(57) ABSTRACT

A wiper device for cleaning a vehicle window is disclosed. The wiper device has a wiper arm fastened in a torque-proof manner to a wiper shaft via an articulation piece, where the wiper arm is arranged pivotably on the articulation piece, a wiper blade arranged on the wiper arm, and a washing device for the wiper blade, which contains a feed for a washing fluid, where the feed runs in a partial region in the longitudinal axis of the wiper shaft and leads to the wiper blade in a direction running substantially perpendicularly to the longitudinal axis.

13 Claims, 4 Drawing Sheets

Figures 4, 9:
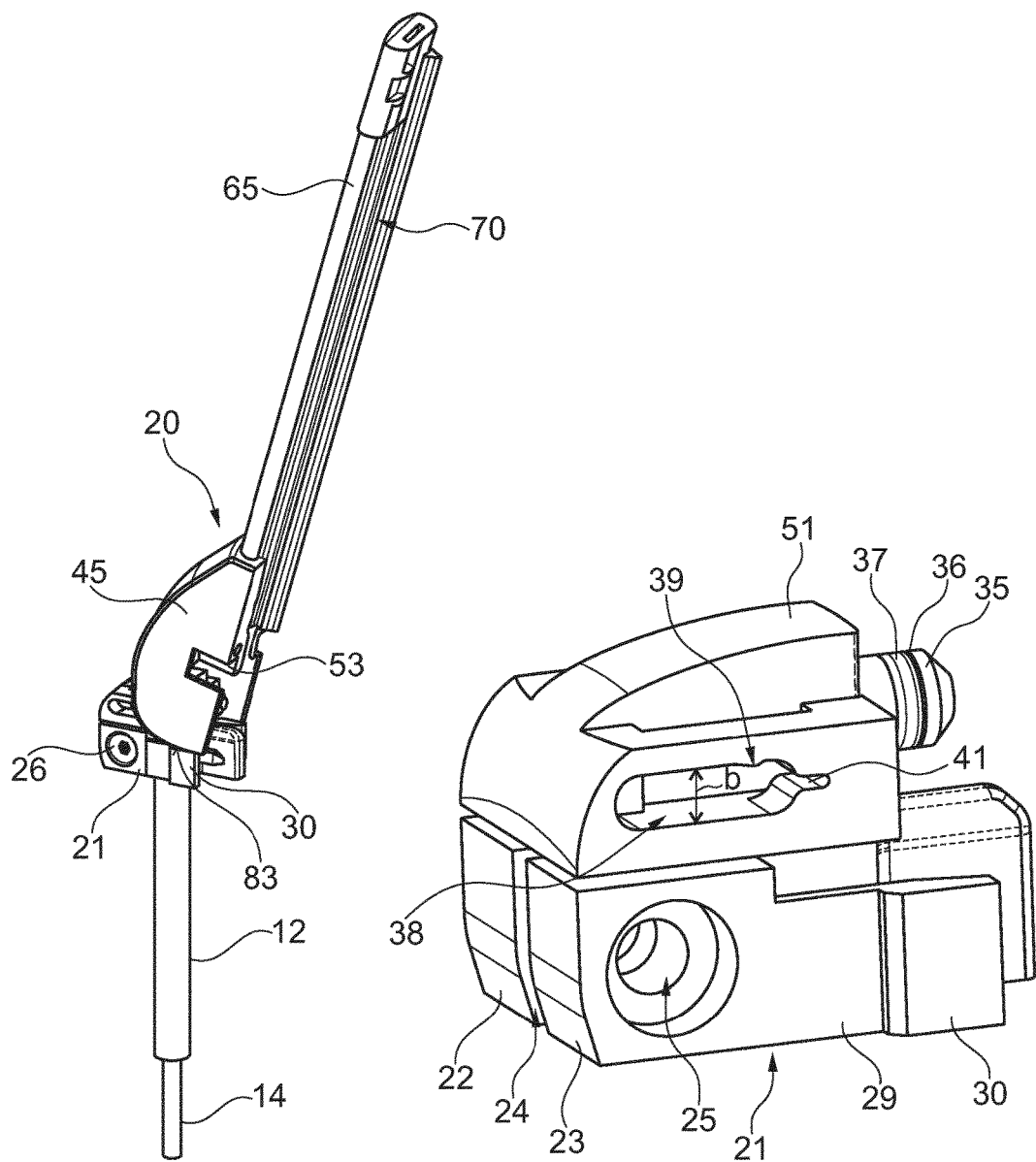

(52) U.S. Cl.
CPC ........... *B60S 1/3436* (2013.01); *B60S 1/3443* (2013.01); *B60S 1/524* (2013.01); *B60S 1/3896* (2013.01)

(58) Field of Classification Search
USPC .......... 15/250.04, 250.351, 250.352, 250.34; 239/284.1, 284.2; 285/184
See application file for complete search history.

(56) References Cited

U.S. PATENT DOCUMENTS

| | | | | | |
|---|---|---|---|---|---|
| 2,732,228 | A | * | 1/1956 | Armstrong | D21F 5/10 285/184 |
| 3,887,956 | A | * | 6/1975 | Wind | B60S 1/522 15/250.04 |
| 5,327,614 | A | * | 7/1994 | Egner-Walter | B60S 1/3415 15/250.04 |
| 5,349,719 | A | * | 9/1994 | Egner-Walter | B60S 1/34 15/250.04 |
| 5,454,134 | A | * | 10/1995 | Edele | B60S 1/3415 15/250.04 |
| 2011/0185531 | A1 | | 8/2011 | Egner-Walter et al. | |
| 2012/0036671 | A1 | | 2/2012 | Boland | |

FOREIGN PATENT DOCUMENTS

| | | |
|---|---|---|
| EP | 1 088 719 A2 | 4/2001 |
| FR | 2 684 343 A1 | 6/1993 |

\* cited by examiner

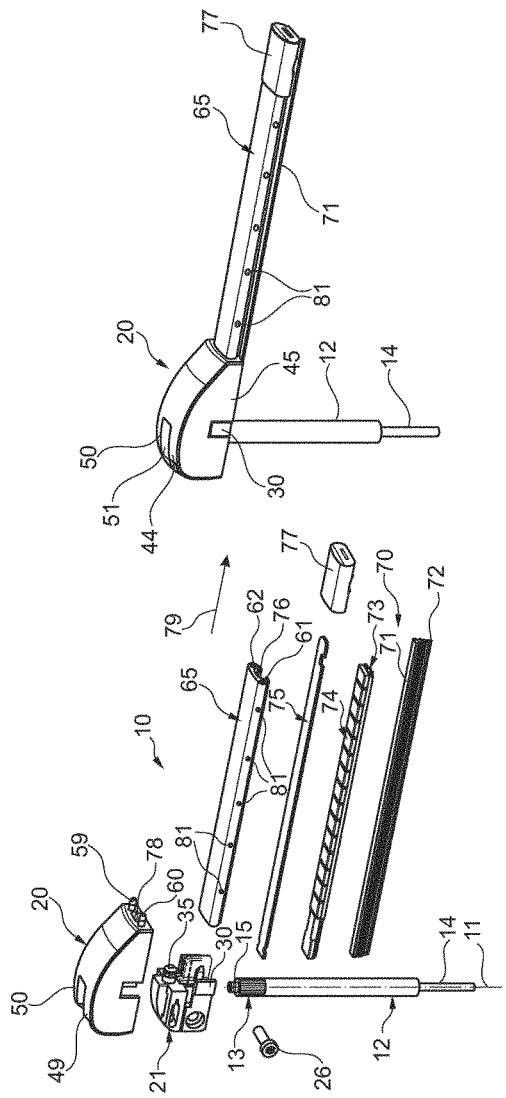

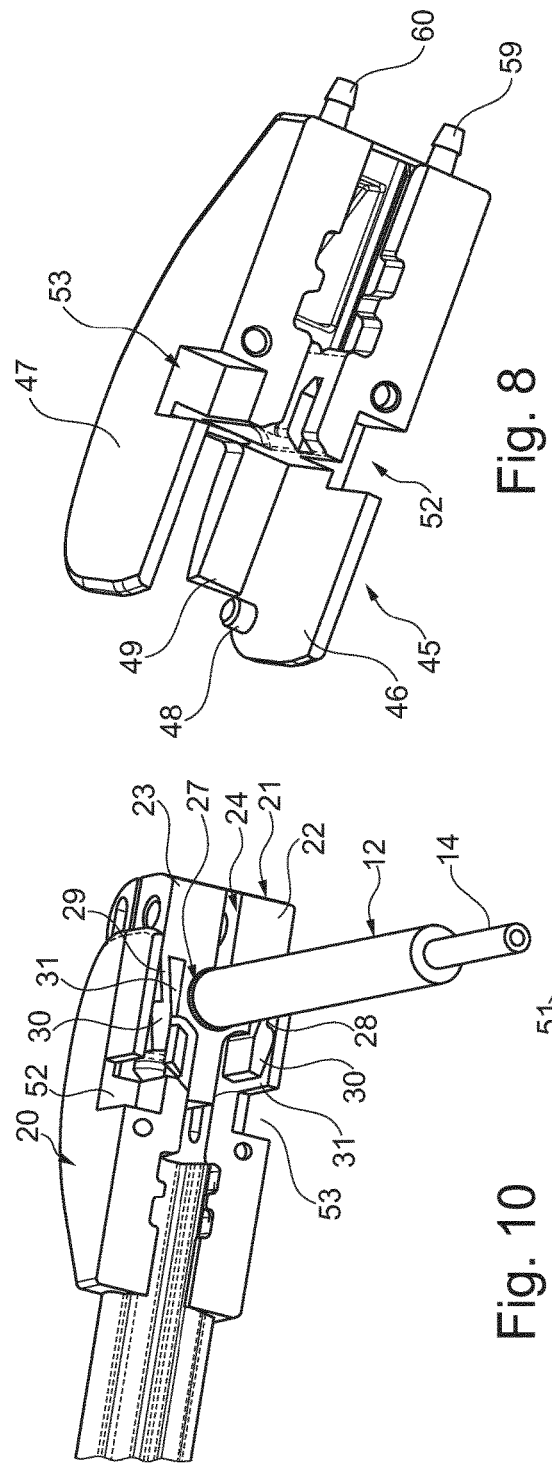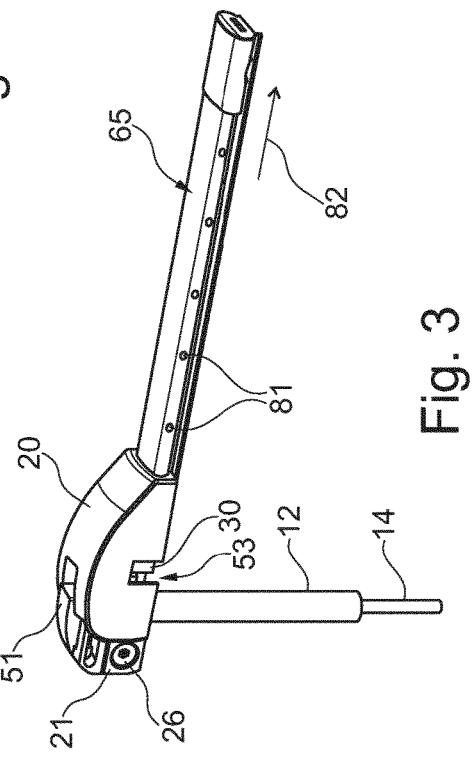

WIPER DEVICE AND WIPER ARM FOR CLEANING A VEHICLE WINDOW

PRIOR ART

The invention relates to a wiper device for cleaning a vehicle window. Furthermore, the invention relates to a wiper arm for use in a wiper device according to the invention.

A wiper device of this type is already known from the prior art and serves to guide a washing liquid from the region of a wiper shaft in the direction of a wiper blade, with the result that, in the case of a movement of the wiper blade, the washing liquid can be applied to the vehicle window immediately in front of the wiper blade. To this end, known wiper devices have a feed tube for the washing liquid, which feed tube is arranged in the longitudinal axis of the wiper shaft and is connected on the side which faces the wiper arm to a washing liquid hose which in turn serves to supply washing liquid channels which are arranged on the wiper blade body. As a result of the fact that the washing liquid hose is of elastic configuration, it is possible to pivot the wiper arm in the region of the wiper shaft, in order, for example, to replace the wiper blade, without it being necessary to remove the washing liquid hose from the feed tube or the wiper blade body. Although hose connections for feeding washing liquids have been proven in practice, in hoses of this type there is in principle the problem of the risk of kinking or damage and material ageing. Moreover, it is necessary to provide a corresponding space for the washing liquid hose in a structural manner by way of corresponding measures, in order that said washing liquid hose can be deformed correspondingly during the pivoting of the wiper arm on the wiper shaft.

DISCLOSURE OF THE INVENTION

Proceeding from the prior art which is shown, the invention is based on the object of developing a wiper device for cleaning a vehicle window in such a way that an alternative concept for feeding a washing liquid from the region of a wiper shaft to a wiper blade body or to the wiper blade is specified, in which concept the use of washing liquid hoses can be dispensed with, without the possibility of pivoting the wiper arm on the wiper shaft being reduced or restricted as a result.

According to the invention, this object is achieved in a wiper device for cleaning a vehicle window by virtue of the fact that the feed (for the washing liquid) comprises an outlet connector which is preferably arranged on the articulation element and is oriented perpendicular with respect to the longitudinal axis of the wiper shaft, that, in the operational position of the wiper blade, the outlet connector engages into a mount which is formed on the wiper arm, and in that the wiper arm is arranged in the articulation piece such that it can move in a longitudinal guide perpendicularly with respect to the longitudinal axis of the wiper shaft at least between two positions, a first position, in which the outlet connector engages into the mount, and a second position, in which the outlet connector is not in engagement with the mount. In other words, this means that the hydraulic connection between the region of the wiper shaft and the wiper blade takes place via an outlet connector and a mount for the outlet connector which produce a hydraulic connection in the operational position, and that the wiper arm is arranged movably in relation to the wiper shaft in such a way that a second position is made possible, in which the outlet connector is not in engagement with the mount. Said second position can be used, in particular, for service and mounting purposes or else for replacing the wiper blade or the wiper arm.

Advantageous developments of the wiper device according to the invention for cleaning a vehicle window are described herein. All combinations of at least two features which are disclosed herein fall within the scope of the invention.

It is very particularly preferred if the wiper arm can be pivoted on the articulation element in the second position. In said second position, it is possible, in particular, for an operator to clean a vehicle window manually, or else to replace a wiper blade on the wiper arm.

In one refinement which is preferred in manufacturing terms, it is provided that the mount together with the washing liquid channels are formed on a wiper arm carrier element of the wiper arm, and that the wiper arm carrier element is configured at least in regions as an injection molded part.

In order to signal clearly defined positions to an operator during pivoting of the wiper arm on the articulation piece, in order that said operator can perform the required tasks without parts of the wiper device being damaged, it is preferably provided, moreover, that the pivoting angle between the articulation piece and the wiper arm is limited by stop elements.

In order to make a hydraulically sealed configuration between the outlet connector and the mount for the outlet connector possible, it is provided, furthermore, that a sealing element (O-ring) is arranged between the outlet connector and the mount.

In order to prevent the wiper arm passing into the second position during washing operation, in which second position the feed of washing liquid is interrupted, it is provided in a further refinement of the invention that the wiper arm is locked in the first position by means of a latching connection, and that the latching connection has at least one manually actuable element for canceling the latching connection. As a result, the wiper arm passes from the first position into the second position only when the operator deliberately actuates the corresponding element.

Furthermore, it can be provided that the wiper arm can be locked in the second position in the longitudinal guide of the articulation part by means of a lug which protrudes into the longitudinal guide, the lug reducing the groove width of the longitudinal guide. As a result, handling is simplified, in particular when replacing a wiper blade on the wiper arm, because the wiper arm remains in the second position in the region of the longitudinal guide, in which there is no mechanical contact between the outlet connector and the mount, with the result that pivoting of the wiper arm is made possible without damage to the addressed components.

Fastening of the wiper arm to the wiper shaft which is particularly simple and can be adapted satisfactorily to the respective conditions is achieved if the wiper arm is fixed on the wiper shaft by means of a clamping connection which has a clamping screw, and if the wiper shaft has a longitudinal toothing system for fixing the wiper arm in various longitudinal positions of the wiper arm on the wiper shaft.

Over the service life of the wiper device, a clamping screw which is arranged in an unprotected manner is exposed to environmental influences which make it difficult, for example, to remove the wiper arm from the wiper shaft if, for example, rust has formed. For this reason, it is provided in a further refinement of the invention that the clamping screw is covered by the wiper arm carrier element in the first position of the wiper arm and is freely accessible in the second position.

Moreover, the invention comprises a wiper arm for use in a wiper device according to the invention.

Figure 7:
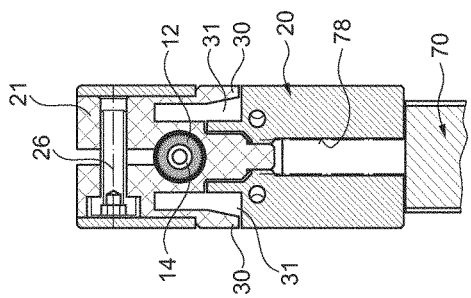
Figure 6:
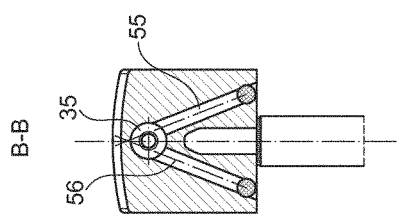
Figure 5:
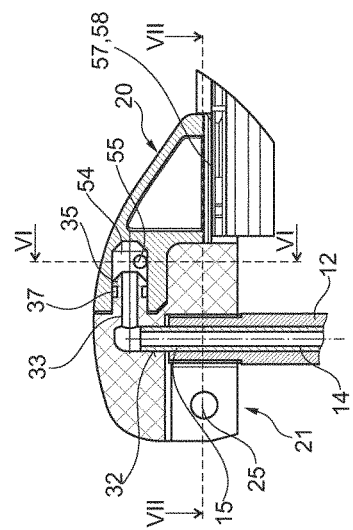

Further advantages, features and details of the invention result from the following description of preferred exemplary embodiments and using the drawing, in which:

FIG. 1 shows the constituent parts of a wiper device according to the invention in an exploded illustration, FIG. 2 shows the wiper device according to FIG. 1 in its operational position in a perspective view, FIG. 3 shows the wiper device according to FIG. 2 when transferring the wiper arm into a mounting position, likewise in a perspective view, FIG. 4 shows the wiper device according to FIG. 2 in a mounting position in a perspective view, FIG. 5 shows the fastening region of a wiper arm on the wiper shaft in longitudinal section, FIG. 6 shows a section in the plane VI-VI from FIG. 5, FIG. 7 shows a section in the plane VII-VII from FIG. 5, FIG. 8 shows a perspective bottom view of a part of the wiper arm, FIG. 9 shows an articulation piece for fastening the wiper arm to the wiper shaft in a perspective view, and FIG. 10 shows the fastening region of the wiper arm on the wiper shaft during transfer between an operational position and a service position in a bottom view.

Identical elements or elements with an identical function are provided with the same designations in the figures.

FIG. 1 shows the essential constituent parts of a wiper device 10 according to the invention for cleaning a vehicle window (not shown in the drawings). In particular, but not in a restrictive manner, the wiper device 10 serves to clean a vehicle window in the rear region of a motor vehicle.

The wiper device 10 has a wiper shaft 12 which can be rotated or pivoted in a longitudinal axis 11 by means of a wiper drive (not shown), the end of which wiper shaft 12, which protrudes out of a vehicle body part or out of the region of the window, has a toothing region 13 with a multiplicity of teeth which are arranged in the longitudinal direction. A feed tube 14 for a washing liquid is arranged inside the wiper shaft 12 which is configured as a hollow shaft, which feed tube 14 is connected to a storage reservoir for the washing liquid. One end of the feed tube 14 which protrudes out of the upper side of the wiper shaft 12 has a sealing ring 15 in a circumferential annular groove.

The toothing region 13 serves to fasten a wiper arm 20 in a rotationally fixed manner. To this end, the wiper arm 20 is connected to the wiper shaft 12 via an articulation piece 21. The articulation piece 21 which is produced from plastic using the injection molding process and is shown in an individual illustration in FIG. 9 has a block-shaped body which, on the underside which faces the wiper shaft 12, has two clamping limbs 22, 23 with a longitudinal slot 24 which is formed between the clamping limbs 22, 23. A transverse hole 25 penetrates the two clamping limbs 22, 23 in a direction perpendicularly with respect to the longitudinal axis of the wiper shaft 12 and serves to receive or fasten a clamping screw 26. As can be seen best using FIG. 10, a receiving hole 27 is formed, moreover, in the region of the two clamping limbs 22, 23, into which receiving hole 27 the wiper shaft 12 protrudes with its toothing region 13. By means of the two clamping limbs 22, 23 and the clamping screw 26, the articulation piece 21 can be fastened in a rotationally fixed manner in various vertical or longitudinal positions on the toothing region 13 by means of a clamping connection.

On opposite sides, moreover, the articulation piece 21 in each case has an outwardly protruding latching tongue 28, 29, the end of which, which faces away from the transverse hole 25, is configured as an actuating element 30 with a grip surface. The two latching tongues 28, 29 and the two actuating elements 30 can be pressed against one another manually, for which purpose the articulation piece 21, as can be seen using FIG. 10, has corresponding clearances 31 toward the inside. As can be seen, moreover, by studying FIGS. 5 and 9 together, the articulation piece 21 has a blind-hole-like mount 32, into which that end of the feed tube 14 which carries the sealing ring 15 protrudes. A hole 33 which points in the direction of the wiper arm 20 emanates from the bottom of the mount 32, which hole 33 is formed in the articulation piece 21, the hole 33 opening in turn into an outlet connector 35. The outlet connector 35 has a circumferential annular groove 36, in which a sealing ring 37 is arranged.

In a manner which is approximately flush with respect to the plane of the outlet connector 35, in each case one longitudinal groove 38 is formed on the two side faces of the articulation piece 21 which lie opposite one another, which longitudinal grooves form a longitudinal guide. On the side which faces the wiper arm 20, the longitudinal groove 38 has a lug 39 on its upper side, in the region of which lug 39 the width b of the longitudinal groove 38 is reduced somewhat, which width b is otherwise constant with the exception of the two end regions. Furthermore, on the side which faces the wiper arm 20, the longitudinal groove 38 continues centrally into a run-out region 41 which has a relatively small groove width.

The wiper arm 20 is fastened pivotably to the articulation piece 21. To this end, the wiper arm 20 has a wiper arm carrier element 45 which is shown in an individual illustration in FIG. 8. Laterally on the side which faces the articulation piece 21, the wiper arm carrier element 45 has in each case one limb region 46, 47, which limb regions 46, 47 in each case have a bearing journal 48 on the inner sides which face one another. The wiper arm carrier element 45 is composed of plastic and is configured as an injection molded part. In the mounted state of the wiper arm carrier element 45, the two bearing journals 48 protrude into the respective longitudinal groove 38 of the articulation piece 21. In each case one covering region 49, 50 is molded on the side which faces away from the wiper shaft 12 between the two limb regions 46, 47 of the wiper arm carrier element 45, between which covering regions 49, 50 a web-shaped upper terminating region 51 of the articulation piece 21 which can be seen in FIG. 9 is received. Here, together with the upper side of the terminating region 51, the two covering regions 49, 50 form a closed surface or upper side in the operational position of the wiper device 10 which is shown in FIG. 2.

On opposite side faces, the wiper arm carrier element 45 has in each case one recess 52, 53 for receiving the actuating elements 30 of the articulation piece 21. Furthermore, a connector mount 54 which can be seen, in particular, in FIG. 5 and the diameter of which is adapted to the diameter of the outlet connector 35 is formed in the wiper arm carrier element 45. The connector mount 54 forms a mount for the outlet connector 35. Two hole sections 55, 56 (FIG. 6) which are arranged in an approximate V-shape with respect to one another emanate approximately from the bottom of the hole of the connector mount 54, into which hole sections 55, 56 hole sections 57, 58 in turn open on the side which faces away from the connector mount 54, which hole sections 57, 58 are connected to washing liquid outlet connectors 59, 60 which are arranged or formed on that side of the wiper arm carrier element 45 which lies opposite the bearing journal 48. The washing liquid outlet connectors 59, 60 engage into washing liquid channels 61, 62 which are formed in a covering element 65 which is a constituent part of the wiper arm 20. The wiper arm 20 is connected to a wiper blade 70 which comprises an elongate wiper rubber 71 with a wiper lip 72 which bears against the vehicle window. The wiper rubber 71 is received in a positively locking manner in a mount 73 of a carrier element 74 which is composed of plastic. Moreover, a recess is formed in the longitudinal direction in the carrier element 74, in which recess a spring bar 75 is arranged. Together with the spring bar 75 and the wiper rubber 71, the carrier element 74 is received in a groove-like mount 76 of the covering element 65.

That side of the wiper blade 70 which faces away from the wiper arm carrier element 45 is closed by way of a closure element 77 which also closes the washing liquid channels 61, 62. Those regions of the carrier element 74, of the wiper rubber 71 and of the spring bar 75 which protrude out of the covering element 65 in the direction of the wiper arm carrier element 45 are arranged in a mount 78 which is formed in the wiper arm carrier element 45. In order to exchange the wiper blade 70 from the wiper arm carrier element 45, it is therefore sufficient to remove the components which were mentioned last in the dismantling direction which is indicated by the arrow 79 in FIG. 1.

Spray openings 81 which open into the washing liquid channels 61, 62 are formed on the two longitudinal sides of the covering element 65 which lie opposite one another. By means of the spray openings 81, the washing liquid which is fed via the feed tube 14, the articulation piece 21, the wiper arm carrier element 45 and the covering element 65 can be applied to the vehicle window.

FIG. 2 shows the operational position of the wiper device 10, in which the wiper lip 71 of the wiper blade 70 bears against the vehicle window (not shown). In this position, the two bearing journals 48 are situated at that end region of the longitudinal grooves 38 which faces the wiper shaft 12. It can be seen that the wiper arm carrier element 45 covers the articulation piece 21 almost completely, the actuating elements 30 being arranged in the recesses 52, 53 of the wiper arm carrier element 45 and forming a latching connection there. When the washing device or the washing function is actuated, washing liquid passes onto the vehicle window, as described above. It is essential here that a hydraulically continuous and sealed connection is achieved for the washing liquid. To this end, as can be seen, in particular, using FIG. 5, firstly the feed tube 14 protrudes sealingly into the receiving hole 27 of the articulation piece 21, and secondly the outlet connector 35 is arranged sealingly within the inlet connector 54 of the wiper arm carrier element 45.

FIG. 3 shows an intermediate position of the wiper arm 20, in which the latter is to be pivoted out of the operational position which is shown in FIG. 2 into a service position which is shown in FIG. 4. To this end, it is necessary first of all to press the two actuating elements 30 on the articulation piece 21 against one another, with the result that the latching connection between the actuating elements 30 and the recesses 52, 53 on the wiper arm carrier element 45 is canceled. The wiper arm 20 can then be moved in the direction of the arrow 82 (FIG. 3), the outlet connector 35 passing out of an operative connection with the connector mount 54. As soon as the wiper arm 20 has passed the region of the lug 39 in the longitudinal groove 38 during the movement of its bearing journals 48, it is no longer possible to pull the wiper arm 20 out of the articulation piece 21 further. In this position, the two bearing journals 48 are situated at that end region of the longitudinal grooves 38 which faces away from the wiper shaft 12. Furthermore, as a consequence of the configuration of the lug 39 in the longitudinal groove 38, this position of the wiper arm 20 can be detected as a latching position by an operator, that is to say the wiper arm 20 can be pushed back again in the direction of the wiper shaft 12 only with the application of an increased mounting force. In that end position of the wiper arm 20 which is furthest away from the wiper shaft 12, it is ensured that the outlet connector 35 is not in contact with the inlet connector 54, with the result that the wiper arm 20 can subsequently be pivoted into the service position which is shown in FIG. 4 and in which the wiper arm 20 is pivoted away from the vehicle window, for example, by an angle of approximately 75°. In this service position, the outer sides of the actuating elements 30 in turn pass into contact with the end sides 83 of the wiper arm carrier element 45 outside the two limb regions 46, 47 of the wiper arm carrier element 45, in accordance with the illustration of FIG. 4, since the actuating elements 30 yield to the outside as a consequence of the elastic attachment by the latching tongues 28, 29. The two actuating elements 30 and the end sides 83 of the wiper arm carrier element 45 therefore form stop elements for limiting the pivoting angle of the wiper arm 20. This service position can therefore also be detected as a latching position by an operator, since pivoting back in the direction of the operational position of the wiper arm 20 is possible only by way of renewed pressing together of the two actuating elements 30. In the service position of the wiper arm 20 which is shown in FIG. 4, the wiper blade 70 can be replaced, for example, or else the vehicle window can be cleaned manually.

The wiper device 10 which has been described here can be altered or modified in a wide variety of ways without departing from the concept of the invention.

LIST OF DESIGNATIONS

10 Wiper device
11 Longitudinal axis
12 Wiper shaft
13 Toothing region
14 Feed tube
15 Sealing ring
20 Wiper arm
21 Articulation piece
22 Clamping limb
23 Clamping limb
24 Longitudinal slot
25 Transverse hole
26 Clamping screw
27 Receiving hole
28 Latching tongue
29 Latching tongue
30 Actuating element
31 Clearance
32 Mount
33 Hole
35 Outlet connector
36 Annular groove
37 Sealing ring
38 Longitudinal groove
39 Lug
41 Run-out region 45 Wiper arm carrier element
46 Limb region
47 Limb region
48 Bearing journal
49 Covering region
50 Covering region
51 Terminating region
52 Recess
53 Recess
54 Connector mount
55 Hole section
56 Hole section
57 Hole section
58 Hole section
59 Washing liquid outlet connector
60 Washing liquid outlet connector
61 Washing liquid channel
62 Washing liquid channel
65 Covering element
70 Wiper blade
71 Wiper rubber
72 Wiper lip
73 Mount
74 Carrier element
75 Spring bar
76 Mount
77 Closure element
78 Mount
79 Arrow
81 Spray opening
82 Arrow
83 End side
b Width

The invention claimed is:

1. A wiper device for cleaning a vehicle window, comprising:
   a wiper arm fastened in a torque-proof manner to a wiper shaft via an articulation piece,
   wherein the wiper arm is arranged pivotably on the articulation piece;
   a wiper blade arranged on the wiper arm; and
   a washing device for the wiper blade, which contains a feed for a washing fluid, wherein the feed runs in a partial region in the longitudinal axis of the wiper shaft and leads to the wiper blade in a direction running substantially perpendicularly to the longitudinal axis, wherein
   the feed comprises an outlet connecting piece arranged on the articulation piece, oriented perpendicularly to the longitudinal axis of the wiper shaft, that the outlet connecting piece engages, in the operating position of the wiper blade, into a mount constructed on the wiper arm, and
   the wiper arm is arranged in the articulation piece in a longitudinal guide perpendicularly to the longitudinal axis of the wiper shaft to be movable at least between two positions, a first position, in which the outlet connecting piece engages into the mount, and a second position, in which the outlet connecting piece is out of engagement with the mount.

2. The wiper device according to claim 1, wherein in the second position, the wiper arm is pivotable on the articulation element.

3. The wiper device according to claim 1, wherein the mount together with washing fluid ducts are constructed on a wiper arm carrier element of the wiper arm, and wherein the wiper arm carrier element is constructed at least partially as an injection moulded part.

4. The wiper device according to claim 1, wherein the pivoting angle between the articulation piece and the wiper arm is delimited by stop elements.

5. The wiper device according to claim 1, wherein a sealing element is arranged between the outlet connection piece and the mount.

6. The wiper device according to claim 1, wherein the wiper arm is arrested in the first position by a detent connection, and that the detent connection has at least one manually actuatable element for clearing the detent connection.

7. The wiper device according to claim 1, wherein in the second position, the wiper arm is able to be arrested in the longitudinal guide of the articulation piece by a nose projecting into the longitudinal guide, wherein the nose reduces a groove width of the longitudinal guide.

8. The wiper device according to claim 1, wherein the wiper arm is fixed on the wiper shaft by a clamping connection having a clamping screw, and that the wiper shaft has a toothing region for fixing the wiper arm in various longitudinal positions of the wiper arm on the wiper shaft.

9. The wiper device according to claim 8, wherein in the first position of the wiper arm, the clamping screw is overlapped by the wiper arm carrier element of the wiper arm and is freely accessible in the second position.

10. An assembly comprising:
    a wiper arm carrier element, comprising a connector mount; and
    an articulation piece, comprising an outlet connector and a receiving hole, the outlet connector arranged on the articulation piece, oriented perpendicularly to a longitudinal axis of the receiving hole,
    wherein the wiper arm carrier element is arranged on the articulation piece perpendicularly to the longitudinal axis of the receiving hole, and pivotably fastened to the articulation piece, to be movable between at least two positions, a first position in which the outlet connector engages into the connector mount, and a second position, in which the outlet connector is out of engagement with the connector mount.

11. The assembly of claim 10, wherein a hydraulically continuous and sealed path is formed through the articulation piece and the wiper arm carrier element in the first position.

12. The assembly of claim 10, wherein:
    the wiper atm carrier element further comprises at least one bearing journal,
    the articulation piece further comprises at least one longitudinal groove, and
    the bearing journal moves within the longitudinal groove as the wiper arm carrier element moves between the first position and the second position.

13. The assembly of claim 10, wherein:
    the receiving hole of the articulation piece is configured to receive a wiper shaft, and
    the wiper arm carrier element further comprises a means to attach a wiper arm.

* * * * *